US008156310B2

(12) United States Patent
Eichenberger et al.

(10) Patent No.: US 8,156,310 B2
(45) Date of Patent: Apr. 10, 2012

(54) METHOD AND APPARATUS FOR DATA STREAM ALIGNMENT SUPPORT

(75) Inventors: Alexandre E. Eichenberger, Chappaqua, NY (US); Michael Karl Gschwind, Chappaqua, NY (US); John-David Wellman, Hopewell Junction, NY (US); Peng Wu, Fairport, NY (US)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 11/518,692

(22) Filed: Sep. 11, 2006

(65) Prior Publication Data

US 2008/0065863 A1 Mar. 13, 2008

(51) Int. Cl.
G06F 15/00 (2006.01)
G06F 15/76 (2006.01)
(52) U.S. Cl. ............................................. 712/7
(58) Field of Classification Search .................. 712/220, 712/7
See application file for complete search history.

(56) References Cited

U.S. PATENT DOCUMENTS

| 4,814,976 | A | 3/1989 | Hansen et al. |
| 5,170,477 | A | 12/1992 | Potter et al. |
| 5,566,312 | A | 10/1996 | Pedneau |
| 5,577,200 | A | 11/1996 | Abramson et al. |
| 5,673,321 | A | 9/1997 | Lee |
| 5,933,650 | A | 8/1999 | van Hook et al. |
| 6,061,779 | A | 5/2000 | Garde |
| 6,113,650 | A | 9/2000 | Sakai |
| 6,202,141 | B1 | 3/2001 | Diefendorff et al. |
| 6,334,176 | B1 * | 12/2001 | Scales et al. ................. 712/4 |
| 6,381,690 | B1 | 4/2002 | Lee |
| 6,484,255 | B1 | 11/2002 | Dulong |
| 6,512,716 | B2 | 1/2003 | Oberlaender et al. |
| 6,539,467 | B1 | 3/2003 | Anderson et al. |
| 6,550,059 | B1 | 4/2003 | Choe et al. |
| 6,553,474 | B2 | 4/2003 | Ito et al. |
| 6,779,049 | B2 | 8/2004 | Altman et al. |
| 6,789,179 | B2 | 9/2004 | Beat |
| 2003/0037221 | A1 | 2/2003 | Gschwind et al. |
| 2003/0056064 | A1 | 3/2003 | Gschwind et al. |
| 2004/0006667 | A1 | 1/2004 | Bik et al. |
| 2005/0273769 | A1 | 12/2005 | Eichenberger et al. |
| 2005/0273770 | A1 | 12/2005 | Eichenberger et al. |
| 2005/0283769 | A1 | 12/2005 | Eichenberger et al. |
| 2005/0283773 | A1 | 12/2005 | Eichenberger et al. |
| 2005/0283774 | A1 | 12/2005 | Eichenberger et al. |
| 2005/0283775 | A1 | 12/2005 | Eichenberger et al. |

OTHER PUBLICATIONS

Hu et al.; Reducing Register File Power Consumption by Exploiting Value Lifetime Characteristics; 2000; IEEE Workshop on Complexity-Effective Design, 27$^{th}$ ISCA, Vancouver, Canada, Jun. 2000.*
Fridman; Data Alignment for Sub-word Parallelism in DSP; 1999; IEEE.*
Tseng et al.; Energy-efficient Register Access; Sep. 2000.*
L. Kohn and N. Margulis "Introducing the Intel i860 64-bit microprocessor," IEEE Micro, vol. 9, Issue 4, Aug. 1989, pp. 15-30.
R. Lee, "Accelerating Multimedia with Enhanced Microprocessors," IEEE Micro, vol. 15, Issue 2 Apr. 1995, pp. 22-32.

(Continued)

Primary Examiner — Corey S. Faherty

(57) ABSTRACT

One embodiment of the present method and apparatus for data stream alignment support includes retrieving a first input from a first register file, retrieving a second input from a second register file, the second register file being dedicated to a stream shift unit and performing the stream shift instruction in accordance with the first input, the second input and a third input.

20 Claims, 8 Drawing Sheets

OTHER PUBLICATIONS

Kohn, et al., "The Visual Instruction Set (VIS) in UltraSPARC," Compcon(1995).
Tremblay, et al., "VIS Speeds New Media Processing," IEEE Micro, Aug. 1996, pp. 10-20.
Sun Microsystems, "VIS Instruction Set User's Manual," Part No. 805-1394-03, May 2001.
D. Greenly, et al., "UltraSPARC: The Next Generation Superscalar 64-bit SPARC," Compcon 1995 Technologies for the Information Superhighway, Digest of Papers, Mar. 5-9, 1995, pp. 442-451.
Lee and Huck, "64-bit and Multimedia Extensions in the PA-RISC 2.0 Architecture," HP Whitepaper, 1996.
Bechega, et al., "A High-Performance SIMD Floating Point Unit for BlueGene/L Architecture, Compilation, and Algorithm Design," Proc. of the International Conference on Parallel Architectures and Compilation.
Bright, et al., "Creating the BlueGene/L Supercomputer from Low Power SoC ASICs," ISSCC 2005, Feb. 2005.
S. Larsen and S.P. Amarasinghe, "Exploiting Superword Level Parallelism with Multimedia Instruction Sets," SIGPLAN Conference on Programming Language Design and Implementation, pp. 145-, 2000.
A. Bik, et al., "Automatic Intra-Register Vectorization for the Intel Architecture," International Journal of Parallel Programming, vol. 30, Issue 2, pp. 65-98, Apr. 2002 Plenum Press.
A. Eichenberger, P. Wu, and K. O'Brien, "Vectorization for Short SIMD Architectures with Alignment Constraints," Proc. SIGPLAN 2004 Conference on Programming Language Design and Implementation, Jun. 2004.
P. Wu, A. Eichenberger, and Amy Wang, "Efficient SIMD Code Generation for Runtime Alignment and Length Conversion", CGO 2005, Mar. 2005.

* cited by examiner

METHOD AND APPARATUS FOR DATA STREAM ALIGNMENT SUPPORT

REFERENCE TO GOVERNMENT FUNDING

This invention was made with Government support under Contract No. H98230-04-C-0920 awarded by the National Security Agency. The Government has certain rights in this invention.

FIELD OF THE INVENTION

The present invention relates generally to memory access in computing systems and relates more particularly to accessing misaligned data streams.

BACKGROUND

Contemporary high-performance processors support multimedia processing using single instruction, multiple data (SIMD) techniques for exploiting data-level parallelism in programs (i.e., for computing more than one item of data per operation at a time). Specifically, SIMD execution allows performance of one operation on multiple sets of data. In general (but not always), such processors contain multiple functional units, some of which are directed to the extension of scalar data and some of which are grouped for the processing of structured SIMD vector data.

Some known processor implementations for computing systems require aligned memory accesses (e.g., data requests), i.e., wherein data to be loaded into memory is properly aligned with the base access width. Because no support is provided for data accesses that are misaligned, data returned in response to a misaligned request normally would include only a portion of the requested data, plus a portion of data that was not requested. This stands in contrast to the data that would be returned in response to the same request by a processor that provides support for misaligned data accesses.

FIG. 1, for example, is a schematic diagram illustrating a portion of an exemplary window 100 of memory 100 in accordance with a typical early processor implementation. The window 100 comprises a plurality of individual bytes $104_0$-$104_5$ (hereinafter collectively referred to as "bytes 104") of data. By way of example, an access unit 102 in accordance with the window 100 comprises four bytes 104 of data. Thus, when a misaligned data request is made (for, say, four bytes 104 of data starting at byte $104_2$—i.e., bytes $104_2$-$104_5$), the requested data is not contained within a single access unit 102, but rather straddles two access units. Access units such as the access unit 102 define aligned pieces of data and may comprise words, quad words, fetch lines, transfer blocks, cache line sizes, memory pages or the like.

The big challenge in supporting misaligned access to memory is to support the unaligned access without undue performance degradation. Support for misaligned access typically comes in two forms: a hardware approach and a software approach. Software approaches, while effective in aligning the data, tend to increase the register pressure. For instance, software approaches that "splice" two loads of data to produce desired data must load double the amount of information that is actually useful in the register. Alternative software approaches that reuse data load less extraneous data in the register, but must preserve this reused data for longer periods of time. Hardware approaches typically relieve the register pressure by providing additional register space, but the additional space comes at a high cost.

Thus, there is a need in the art for a high-performance method and apparatus for accessing misaligned data streams.

SUMMARY OF THE INVENTION

One embodiment of the present method and apparatus for data stream alignment support includes retrieving a first input from a first register file, retrieving a second input from a second register file, the second register file being dedicated to a stream shift unit and performing the stream shift instruction in accordance with the first input, the second input and a third input.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for accessing misaligned data streams. In one embodiment, the present invention exploits the advantages of both software- and hardware-based approaches to supporting misaligned memory accesses by associating a dedicated register with a stream shift function. The stream shift function may be considered akin to a "permute" or shuffle" function, from a compiler perspective, and processes data from both the dedicated streamshift register and from a separate general-purpose (i.e., non-dedicated, non-streamshift) register. This shifts a majority of the register pressure to the dedicated streamshift register, allowing for data reuse with less pressure exerted on the remaining general-purpose registers.

The present invention has particular applicability in the field of single instruction, multiple data (SIMD) execution techniques, which generally require data in registers to be well-aligned before performing operations on the data. SIMD data streams are often used to represent multimedia data types. For example, color information may be represented in accordance with the red, green, blue (RGB) format by encoding the red, green and blue components in a structured data type using the triple (r, g , b), or by using coordinate information, encoding position as the quadruple (x, y, z, w).

In accordance with the present invention, data streams may be created and/or allocated by a programmer, by a compiler or other appropriately configured program, or by a runtime apparatus.

Figure 1:
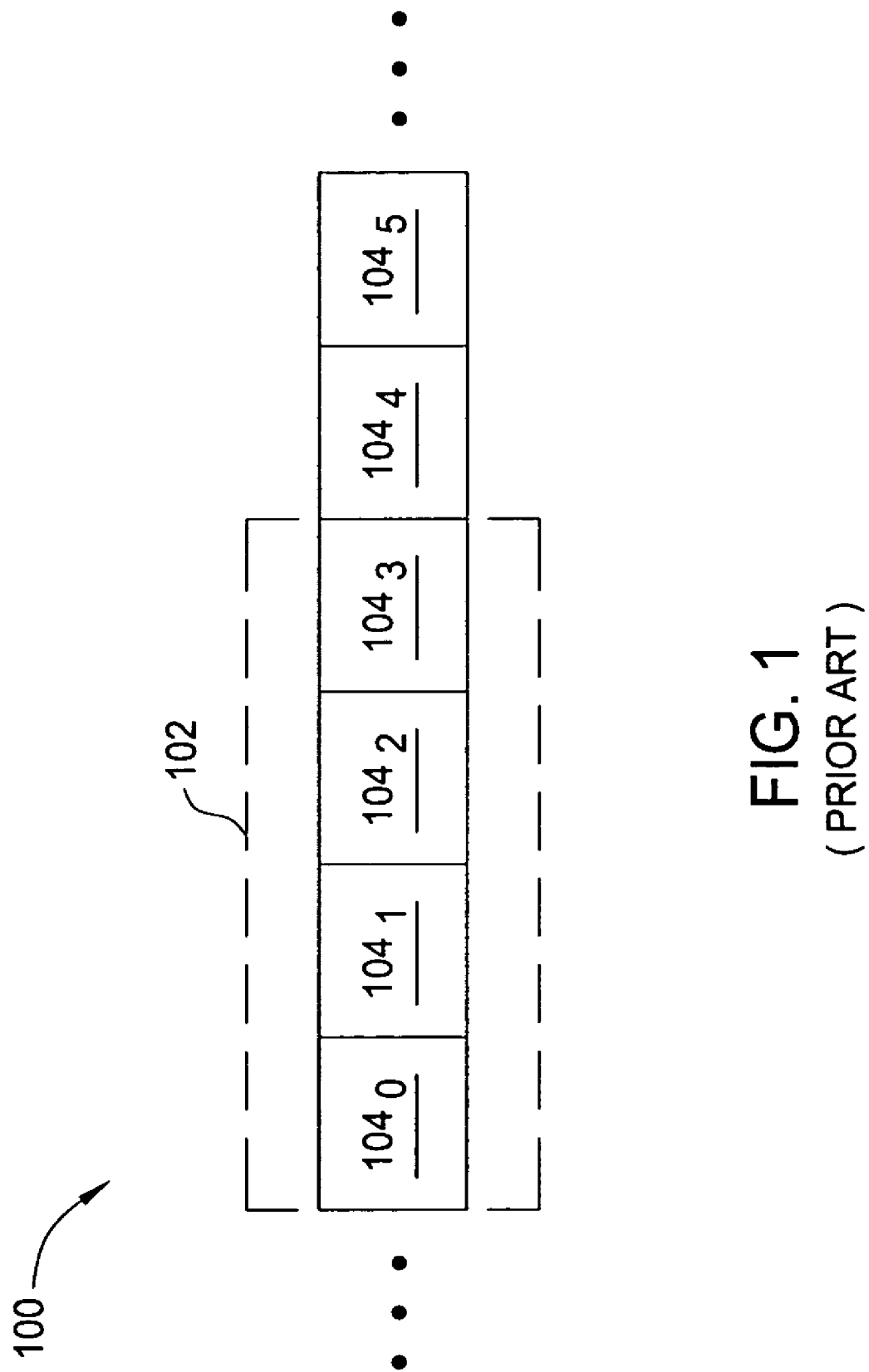
FIG. 1 is a schematic diagram illustrating a portion of an exemplary window of memory in accordance with a typical early processor implementation.
Figure 2:
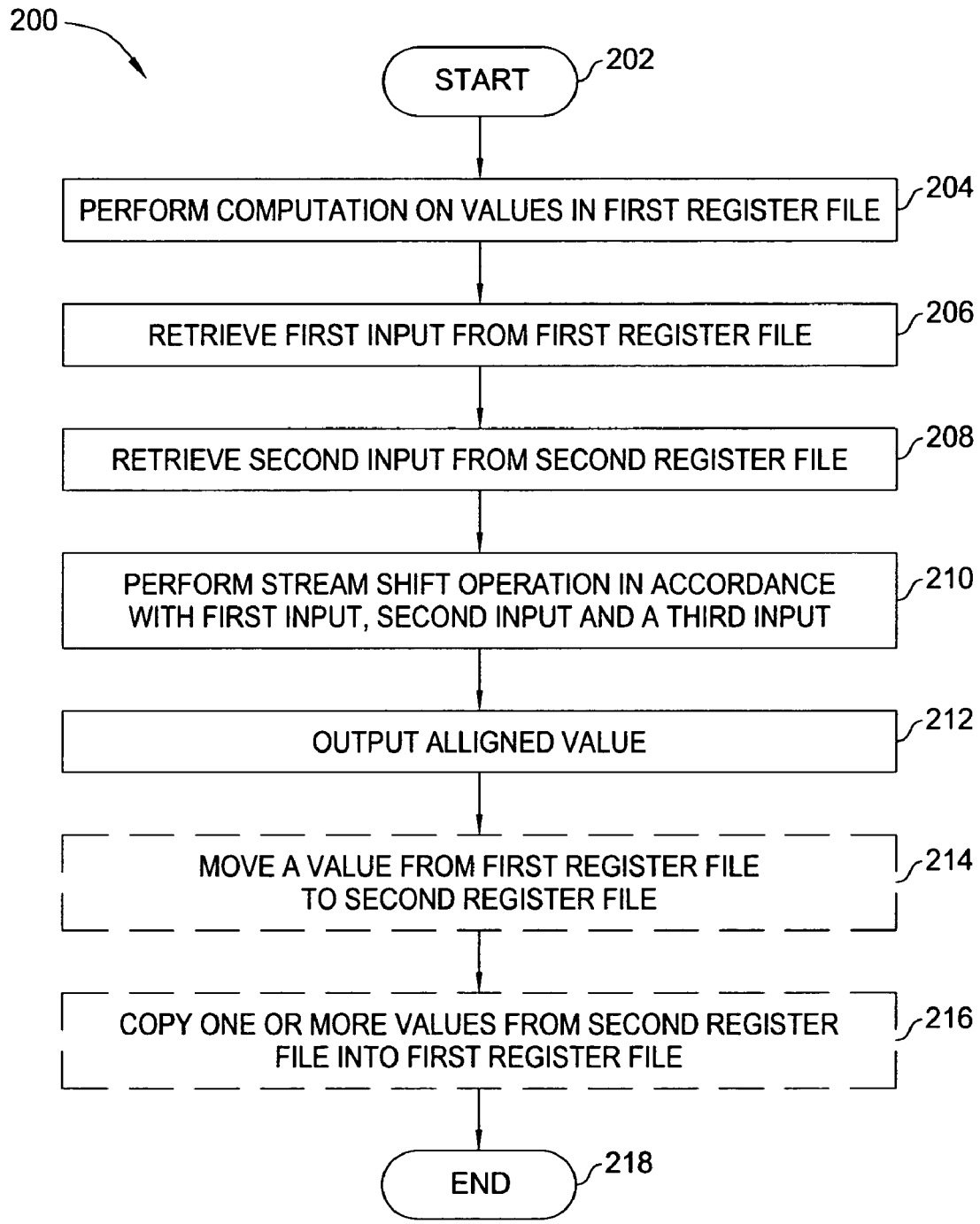
FIG. 2 is a flow diagram illustrating one embodiment of a method for responding to requests for misaligned data, according to the present invention.

FIG. 2 is a flow diagram illustrating one embodiment of a method 200 for responding to requests for misaligned data, according to the present invention. The method 200 may be implemented in, for example, a data access alignment unit that interacts in a computing system with a processor and a memory to fulfill processor requests for data streams in the memory, including misaligned data streams. The alignment unit is associated with a new stream shift instruction, referred to herein as "VSTREAMSHIFT", which can share the same structure as permute or shuffle logic present in most SIMD Instruction Set Architectures (ISAs).

The method 200 is initialized at step 202 and proceeds to step 204, where the method 200 performs a computation on values (e.g., vector elements) in a first register file, where the first register file is one of a plurality of general-purpose register files. In one embodiment, the computation is an SIMD computation. In one embodiment, the first register file is one of a plurality of general-purpose vector (e.g., SIMD) register files. A vector register file is a register file in which each register holds a vector of values (e.g., a vector register of sixteen bytes may hold a vector of sixteen single-byte values, eight double-byte values, four quad-byte values, two eight-byte values or one sixteen-byte value). In one embodiment, the values in the registers of the first register file are loaded from memory. In step 206, the method 200 retrieves a first input from a first register file. In one embodiment, the first input comprises the values of one register in the first (general-purpose) register file. In one embodiment, the first input corresponds to memory data loaded in the first (general-purpose) register file.

In step 208, the method 200 retrieves a second input from a second, dedicated streamshift register file. Specifically, the second register file is dedicated to or associated with a stream shift unit that is responsible for realigning data (when necessary). By "dedicated", it is meant that the second register file is accessible by only a limited number of instructions (namely, the VSTREAMSHIFT functions). Thus, within the context of the present invention, the "general purpose" register file referenced in step 204-206 is any register file that is not a dedicated streamshift register file. In one embodiment, the second register file is a vector register file. In a further embodiment, the second register file comprises register files that contain more than one piece of independent data that can be processed at once or in a pipelined manner (e.g., by an SIMD or vector unit of a given width). In one embodiment, the second input corresponds to data copied into the second register file by a previous stream shift instruction. In one embodiment, at least some of the data loaded in the second register file is migrated from the first register file (e.g., as the method 100 retrieves the first input from the first register file, it also loads the first input in the second register file for later use). A computation similar to that performed in step 204 may be performed on this data in the second register file prior to its retrieval in step 208 as the second input.

The method 200 then proceeds to step 210 and performs a stream shift operation to select a sequence of bytes using the first input, the second input and a third input, in accordance with the VSTREAMSHIFT instruction. In one embodiment, the third input is retrieved from or supplied by one of the first (general-purpose) register file or the second (dedicated streamshift) register file. In one embodiment, the third input is retrieved from or supplied by a general purpose register file (e.g., the first register file) that is used by a processor to hold memory addresses. Since alignment is typically dictated by memory alignment, the address of the memory access directly provides alignment information for data residing at that address. Thus, when shifting data (e.g., loaded by a SIMD load operation or prior to a store operation), as described in greater detail below, the memory address involved in such a memory operation can be used as a source of information to compute the shift "offset". This offset would be computed as the address masked, so as to keep only the lower n bits of the address in a system that requires aligned data at boundaries of $2^n$.

In one embodiment, the third input defines a nature of an alignment operation to be performed on the first input and the second input, in accordance with the stream shift operation. For example, the third input may define an offset, o (e.g., either passed as a literal or as an operand pointing to a register containing the precise offset). In one embodiment, the third input directs that the first input and the second input should be logically concatenated, starting with the first input followed by the second input.

In one embodiment, a determination to perform the stream shift operation is software-controlled. In a further embodiment, the stream shift operation results in a shifting of alignment of the computation performed in step 204. In a further embodiment still, both the first input and the second input are shifted in accordance with an amount specified by the third input.

In one embodiment, the VSTREAMSHIFT instruction is defined as $V$STREAMSHIFT Dest, Input, Offset where the VSTREAMSHIFT instruction is associated with two input registers and one output register. In one embodiment, the shift offset is a literal. In another embodiment, the shift offset is a register containing the offset value, where only the last significant bits (or a subset of the last significant bits) of the value are taken into consideration (e.g., on a machine with sixteen-byte vector registers, aligning operations shift data by sixteen bytes at most; thus, only the last four bits of the offset need be taken into consideration). Defining, without loss of generality, the first (general-purpose) register as Rxx and the second (dedicated streamshift) register as Dxx, where xx is a register file number, the VSTREAMSHIFT instruction can be further defined as:

---

VSTREAMSHIFT dest, input, offset
Rdest = PERMUTE (Dinput, Rinput, offset)

---

Where PERMUTE (A, B, offset) is defined as follows. A new value set into register Rdest is computed, when targeted by the PERMUTE (A, B, offset) instruction, by first concatenating the data of the input (register) A with the data of input (register) B. For example, if the data width of a vector unit is sixteen bytes, the concatenated data includes the data from input A at byte offsets zero through fifteen, followed by the data from input B at byte offsets sixteen through thirty-one. The PERMUTE (A, B, offset) instruction then logically skips the first o bytes from the concatenated data (where o is the offset value, either obtained from an input literal or from the last significant buts of an input register), logically keeps the next sixteen bytes of data from the concatenated data, and then logically ignores or discards the remaining bytes of the concatenated data. In one embodiment, the third input described above provides a skip count that specifies the number of bytes to be skipped, where the skip count, s=o. The sixteen kept bytes are then written into Rdest. To generalize to machines of different vector word (or wide word) unit widths, the number of "kept" bytes written to Rdest equals the byte width of the SIMD unit.

In step 212, the method 200 outputs an aligned value that is the result of the stream shift operation. In one embodiment, the result of the stream shift operation corresponds to an unaligned memory sequence of bytes loaded from a memory address, the memory address having been used to generate a memory read request to load the first input from memory and to generate the third input. The aligned value is output to the first (general-purpose) register file. In one embodiment, the resultant aligned value logically comprises Rdest, as described above. In one embodiment, the method 200 performs a write update of a first result to the first register file and a write update of a second result to the second (dedicated streamshift) register file. In this case, the first result corresponds to the result of the stream shift operation, while the second result corresponds to the first input.

In an alternative embodiment, the VSTREAMSHIFT instruction is associated with three input registers and one output register, in order to eliminate explicit naming conventions between the input register files. Thus, the VSTREAMSHIFT instruction is defined as ---
VSTREAMSHIFT Rdest, Dinput, Rinput', offset
Rdest = PERMUTE (Dinput, Rinput', offset)
---

Adding the additional input register in the instruction encoding affords the advantage of increased flexibility. However, this also requires the use of more "expensive" opcodes, since four independent register names are needed. This is because in most ISAs, there tend to be fewer available opcodes with four independent register names than there are available opcodes with three independent register names. In one embodiment, the shift offset is a literal. In another embodiment, the shift offset is a register containing the offset value, where only the last significant buts are taken into consideration (e.g., on a machine with sixteen-byte vector registers, aligning operations shift data by sixteen bytes at most; thus, only the last four bits of the offset need be taken into consideration).

In another alternative embodiment, the restricted stream shift is replaced with a more general permute function. Permute functionality in this case would be similar to that of the shuffle function (in the synergistic processing elements or SPE processor), the permute function (in the Vector/SIMD Multimedia Extensions or VMX processor), or similar operations. While more general, this approach does require a mask to be in register, even when alignment is known at compile time. Thus, the VSTREAMSHIFT instruction is defined as:

---
VSTREAMSHIFT_PERMUTE Rdest, Dinput, Rmask
Rdest = PERMUTE (Dinput, Rinput, Rmask)
--- or, with independent Dinput and Rinput as:

---
VSTREAMSHIFT_PERMUTE Rdest, Dinput, Rinput', Rmask
Rdest = PERMUTE (Dinput, Rinput', Rmask)
---

In this embodiment, the PERMUTE operation can perform arbitrary byte shuffling as indicated by Rmask. An example of such a mask is one where each byte in the Rmask indicates which data is to be placed in its corresponding byte in the output (e.g., the $n^{th}$ byte in the mask indicates which data should appear in the $n^{th}$ byte of the output). Thus, each byte in the mask indicates the byte address of where to find the data from the concatenated Dinput and Rinput data (or Dinput and Rinput' data, depending on the embodiment). In addition, each byte in Rmask may also indicate a constant value, instead of an address in the concatenated inputs. For example, on a sixteen-byte-wide vector unit, the concatenated inputs would be thirty-two bytes long (2×16 bytes), requiring a thirty-two-value address field. However, because each byte address is capable of expressing 256 values, there are potentially 224 distinct, independent constant values that could also be generated by such masks.

Referring back to FIG. 2, in step 214 (illustrated in phantom), the method 200 optionally moves one or more values from the first (general-purpose) register file to the second (dedicated streamshift) register file. In one embodiment, a value is moved from the first register file to the second register file if it is determined that the output value computed in step 210 should be ignored. In one embodiment, a determination to move a value from the first register file to the second register file is software-controlled. In one embodiment, the value is moved to the second register file as soon as possible, in order to lower the register requirement in the first register file. That is, the value is moved once a second value that the value will replace in the second register file is no longer required. In one embodiment, another new stream shift instruction, herein referred to as "VSTREAMSHIFT_UPDATE", is associated with this operation. In this embodiment, the VSTREAMSHIFT_UPDATE merges the copy instructions from/to the second register file with the permuting of data (e.g., as embodied in step 210 and in the VSTREAMSHIFT instruction).

In one embodiment, the VSTREAMSHIFT_UPDATE is defined as follows:

---
VSTREAMSHIFT_UPDATE dest, input, offset
Rdest = PERMUTE (Dinput, Rinput, offset)
Dinput = Rinput
--- when VSTREAMSHIFT is defined as VSTREAMSHIFT dest, input, offset (i.e., associated with two input register files and one output register file), and PERMUTE (A, B, offset) is defined as described above.

In an alternative embodiment (i.e., where VSTREAMSHIFT is defined as VSTREAMSHIFT Rdest, Dinput, Rinput', offset and is associated with three input registers and one output register), the VSTREAMSHIFT_UPDATE is defined as follows:

VSTREAMSHIFT_UPDATE Rdest, Dinput, Rinput', offset
Rdest = PERMUTE (Dinput, Rinput', offset)
Dinput = Rinput'

In yet another alternative embodiment (i.e., where VSTREAMSHIFT is defined as VSTREAMSHIFT_PERMUTE Rdest, Dinput, Rmask and the restricted stream shift is replaced with a more general permute function), VSTREAMSHIFT_PERMUTE_UPDATE is defined as follows:

VSTREAMSHIFT_PERMUTE_UPDATE Rdest, Dinput, Rmask
Rdest = PERMUTE (Dinput, Rinput, Rmask)
Dinput = Rinput' or, with independent Dinput and Rinput as:

VSTREAMSHIFT_PERMUTE_UPDATE Rdest, Dinput, Rinput', Rmask
Rdest = PERMUTE (Dinput, Rinput', Rmask)
Dinput = Rinput'

In an alternative embodiment, there is no such "update" instruction. In this case, a separate instruction is needed to move data between the first (general-purpose) register file and the second (dedicated streamshift) register file. Such an approach increases the number of dynamic instructions up to one additional instruction per permute.

In step 216 (illustrated in phantom), the method 200 optionally copies one or more values from the second register file into the first register file. It may be desirable to copy values from the second register file into the first register file, for example, in order to save architectural state information upon a function call or context change. Alternatively, if one can construct the output value computed in step 210 such that the output value comprises only data from the second register file, then there is no need for a separate copying of data to the first register file in step 216. In one embodiment, a determination to copy a value from the second register file to the first register file is software-controlled.

Figure 3:
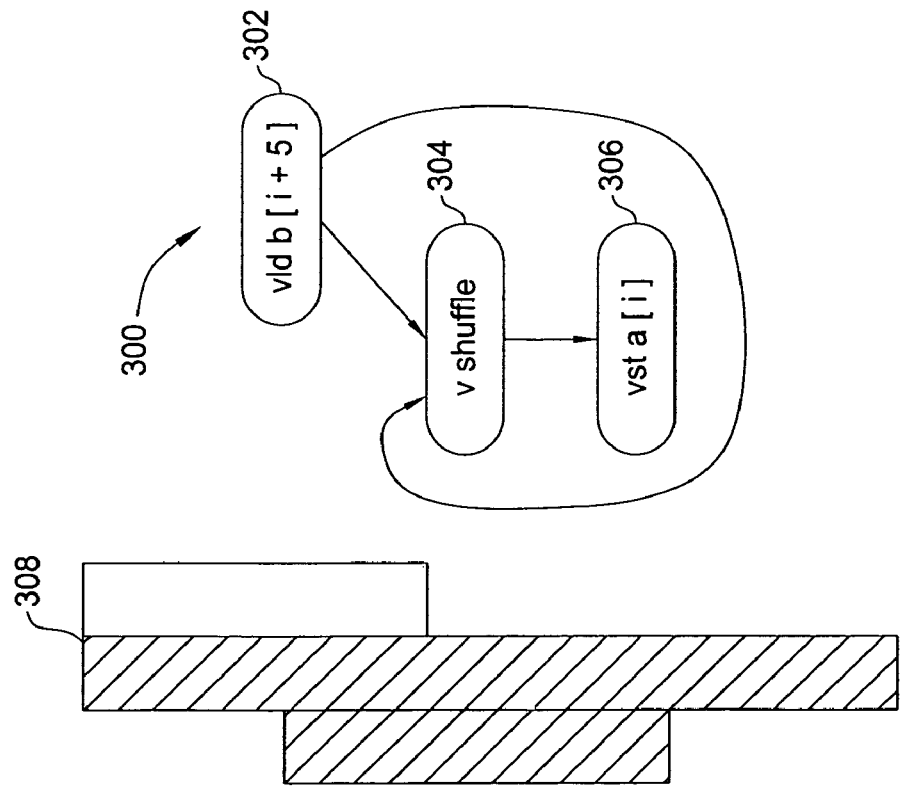
FIG. 3 is a schematic diagram illustrating the operation of an optimized SIMD code sequence (without a dedicated VSTREAMSHIFT instruction) that reuses register files.

Because of the nature of the alignment of streams in software, the partitioning of values among the general-purpose and dedicated streamshift register files, as proposed by the method 200, is optimal in most loops, making the method 200 both practical and efficient. For example, FIG. 3 is a schematic diagram illustrating the operation of an optimized SIMD code sequence 300 (without a dedicated VSTREAMSHIFT instruction) that reuses registers. In particular, FIG. 3 illustrates the steady-state behavior of a loop (namely, each iteration), and does not illustrate the behavior exhibited during the first and last iterations where state is being filled and drained, respectively. As illustrated, values loaded from memory to a register 302 are used twice in accordance with a shuffle function 304 to produce output 306. The functionality of the shuffle function 304 can be generally understood as the PERMUTE function, but in which all input and output registers reside in the same, non-dedicated (general purpose) register file. The amount of time that these values must be kept in a (general-purpose) register is represented by the bars 308 on the left hand side of FIG. 3. As illustrated, because values in the register files are reused, these values must be kept longer in the register (as compared to code sequences that do not reuse values), which increases the register pressure (i.e., no new values can be loaded to these registers while these registers contain values that are to be reused).

Figure 4:
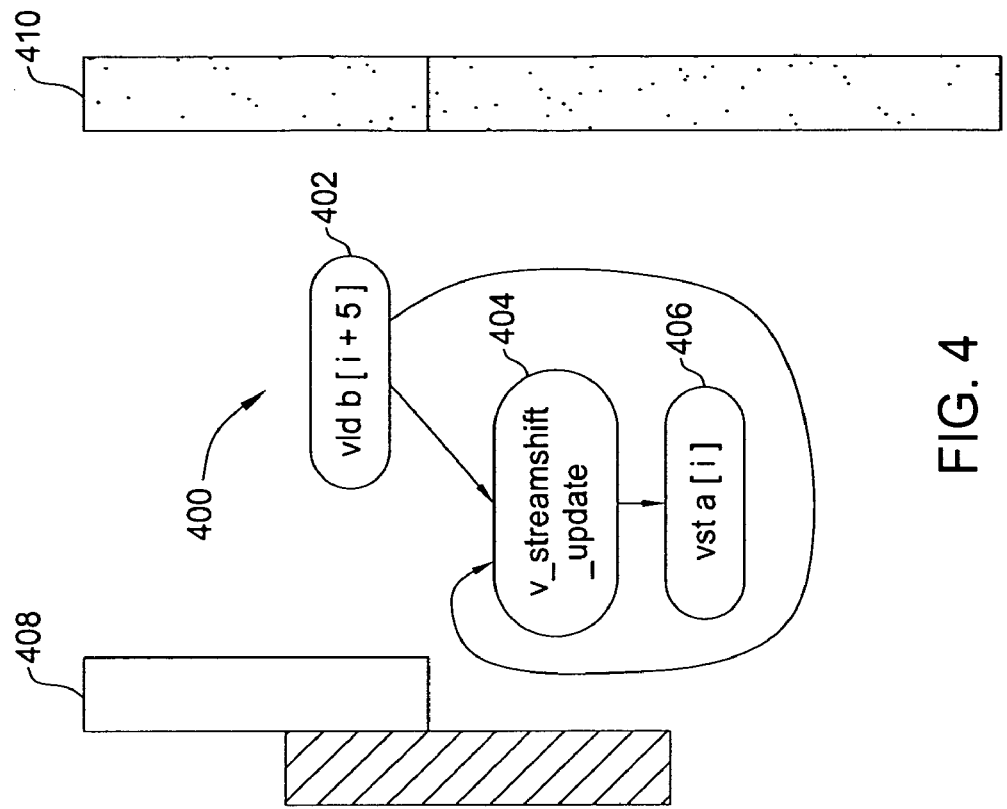
FIG. 4 is a schematic diagram illustrating the operation of a code sequence implementing a VSTREAMSHIFT instruction.

FIG. 4, on the other hand, is a schematic diagram illustrating the operation of a code sequence 400 implementing a VSTREAMSHIFT_UPDATE instruction. As in FIG. 3, values loaded from memory to a register 402 are used twice in accordance with the VSTREAMSHIFT_UPDATE function 404 to produce output 406. Unlike FIG. 3, however, the register pressure is significantly reduced by implementing the VSTREAMSHIFT_UPDATE instructions in accordance with both a general-purpose register 408 and a dedicated streamshift register 410. The register pressure thereby shifts from the general-purpose register 408 to the dedicated streamshift register 410. This as much as doubles the capacity of the general-purpose register 408, and no extra copy instruction is necessary.

The approach presented by the method 200 is very frugal in terms of additional operation codes (opcodes), as it uses only two additional opcodes (i.e., VSTREAMSHIFT and VSTREAMSHIFT_UPDATE) but can provide up to twice the number of additional registers. Even higher numbers of additional registers can be provided (i.e., more than twice the number), if desired, by dedicating additional bits in the encoding when expressing the register number of the second (dedicated streamshift) register file. The method 200 is also more flexible, compared to hardware-based approaches to adding unaligned loads/stores, because the method 200 is not coupled with load (and thus can be used to align values produced by any SIMD operation). For example, for a computation like a[i]=b[i+1]+c[i+1], one can, in accordance with the method 200, realign data after values b[i+1]+c[i+1] are computed, rather than realign each load b[i+1] and c[i+1]. In addition, although the method 200 is presented in the context of alignment handling, the instructions introduced herein may be used to implement any permutation scheme that mimics patterns where data is not only realigned, but also packed or unpacked, for example to accommodate different sizes of data.

None of the embodiments of the method 200 described above require doubling of the number of vector registers in the second (dedicated streamshift) register file. It is possible that the second register file implements only a subset of the registers in the second register file, as long as the compiler and the programmer know this and allocate registers appropriately. In addition, most embodiments of the method 200 do not require the building of additional permute units beyond those already available in most SIMD architecture.

The method 200 is thus desirable from a compiler perspective because the additional VSTREAMSHIFT instructions behave in manners very similar to the traditional permute/shuffle instructions found in most SIMD architecture. Thus, a compiler performs the following tasks: (1) identifies SIMDizable code; (2) generates intermediate shift stream representations; (3) generates codes to compute dynamic runtime alignment; (4) transfers to required presentations in registers; and (5) translates shift stream codes to machine code, utilizing VSTREAMSHIFT to dynamically align data streams.

Figure 5:
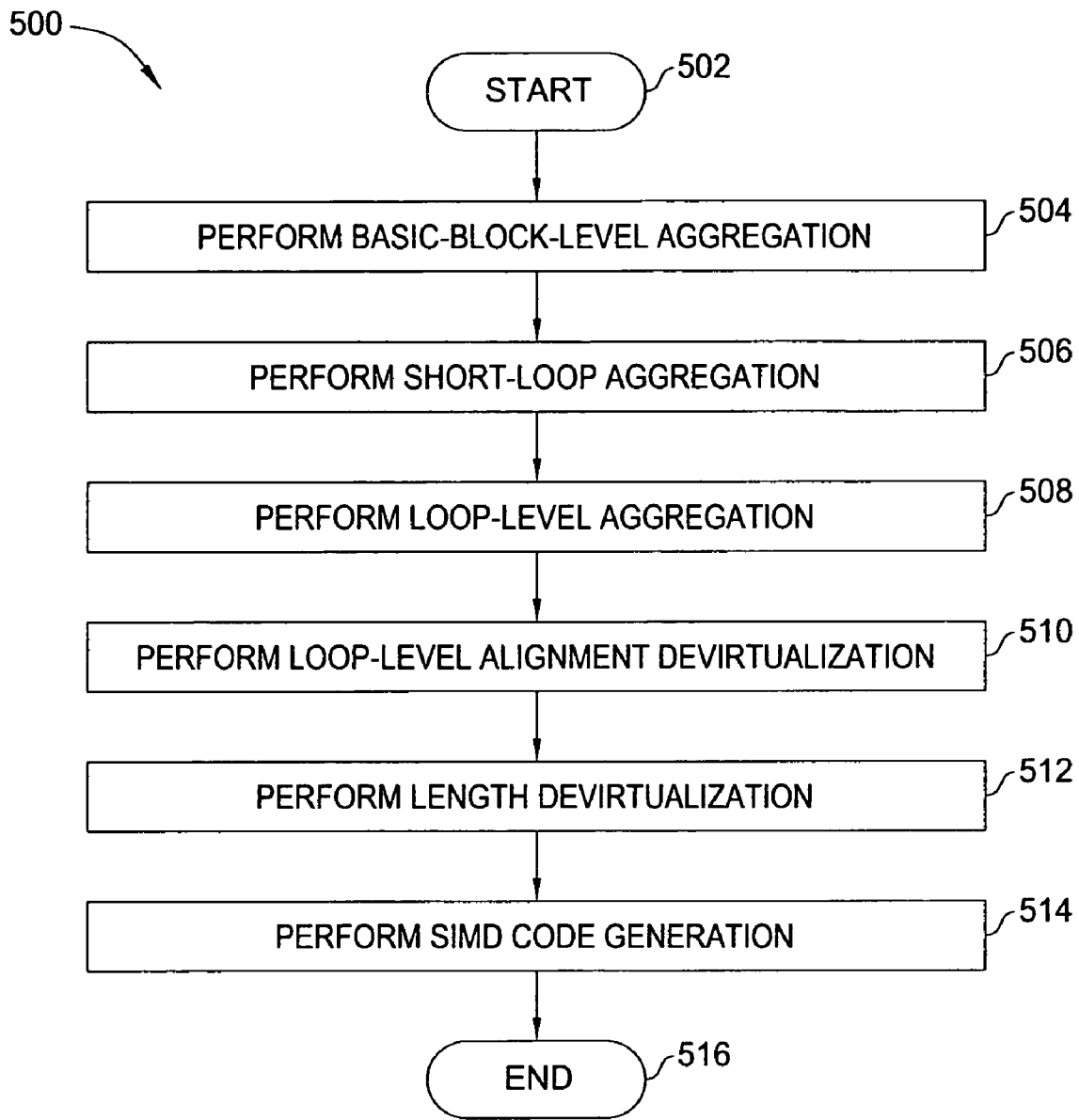
FIG. 5 is a flow diagram illustrating a more detailed embodiment of a SIMDization method executed by a compiler, according to the present invention.

FIG. 5 is a flow diagram illustrating a more detailed embodiment of a SIMDization method 500 executed by a compiler, according to the present invention. The method 500 is initialized at step 502 and proceeds to step 504, where the method 500 performs basic-block-level aggregation. In particular, the method 500 extracts SIMD parallelism within a basic block by packing isomorphic computation on adjacent memory accesses to vector operations. Vectors produced by this phase have arbitrary lengths and may not be aligned.

In step 506, the method 500 performs short-loop aggregation. Specifically, the method 500 eliminates SIMDizable inner loops with short, compile-time trip counts by aggregating static computation on stride-one accesses across the entire loop into operations to longer vectors. Thus, given a short loop with a compile-time trip count, u, any data of type t in the loop becomes vector V(u, t) after the short-loop aggregation. Vectors produced by this phase have arbitrary lengths and may not be aligned.

In step 508, the method 500 performs loop-level aggregation. Specifically, the method 500 extracts SIMD parallelism across loop iterations. Computations on stride-one accesses across iterations are aggregated into vector operations by blocking the loop by a blocking factor, B. Any data of type t in the loop becomes vector V(B, t) after the aggregation. The blocking factor, B, is determined such that each vector V(B, t) is always a multiple of $P_{VL}$ bytes (i.e., B*len(t) mod $P_{VL}$=0). The smallest such blocking factor is:

$$B = P_{VL}/GCD(P_{VL}, \text{len}(t_1), \ldots, \text{len}(t_k))$$

where GCD is the greatest common divisor among all of the inputs, lent(t) is the byte length of an item of data of type t, and $P_{VL}$ is the width of the vector unit in bytes. Vectors produced by this phase have a vector length that is a multiple of $P_{VL}$ bytes, but may not be aligned. Thus, steps 504-508 function together to identify SIMDizable code (i.e., to extract SIMD parallelism at different program scopes into generic operations on virtual vectors, which will subsequently serve as a basis to abstract the alignment and finite length constraints of the SIMD architecture).

In step 510, the method 500 performs loop-level alignment devirtualization. In this step, the method 500 loads and stores from possibly unaligned vectors to aligned vectors using the stream-based alignment handling method described with reference to FIG. 2 (i.e., the method 200). This method is able to handle loops with arbitrary misalignments. In this method, stride-one memory accesses across iterations are viewed as streams, and two streams are considered relatively misaligned if their first elements have different alignments, called stream offset. When misaligned, a stream shift is performed on one of the two streams by shifting the entire stream across registers to match the offset of the other stream. Vectors produced by this phase are always aligned and have a vector length that is a multiple of $P_{VL}$ bytes.

Step 510 therefore attempts to minimize the number of data reorganizations by lazily inserting data reorganization (shiftstream) until absolutely needed. In doing so, the method 500 introduces shiftstream only when two streams are relatively misaligned with each other. Such a shiftstream operation can easily be mapped to the VSTREAMSHIFT instruction described above with reference to FIG. 3. Thus, step 510 proceeds smoothly, without having to introduce loop replication due to misaligned data streams and with less register pressure than when VSTREAMSHIFT instructions are not implemented.

In step 512, the method 500 performs length devirtualization. Specifically, the method 500 first flattens vectors to vectors of primitive types. The method 500 then maps operations on virtual vectors to operations on multiple physical vectors, or reverts the virtual vectors back to scalar operations, based on the length of the virtual vectors, whether the virtual vectors are aligned and other heuristics that determine whether to perform the computation in vectors or scalars. Thus, steps 510 and 512 function together to devirtualize virtual vectors to match precise architecture constraints (i.e., to generate an intermediate shift stream representation). Thus, step 512 functions to lower the generic vector operations to platform-specific instructions (i.e., to generate code to compute dynamic runtime alignment, to transfer to required presentation in registers and to translate shift stream codes to machine codes). Vectors produced by this phase are physical vectors.

In step 514, the method 500 performs SIMD code generation. In particular, the method 500 maps generic operations on physical vectors to one or more SIMD instructions or intrinsics, or to library calls according to the target platform.

Step 514 therefore replaces stream-shifts with actual operations on a target machine. In one embodiment, each instance of a streamshift is replaced with an actual VSTREAMSHIFT instruction. Depending on the particular embodiment, either a mask or an offset is computed prior to the loop entry (when the shifting amount is only known at runtime) or the mask or offset is given as a literal to the VSTREAMSHIFT instruction (when the shifting amount is known at compile time and literal offset values can be passed to the VSTREAMSHIFT instructions.

For embodiments implementing VSTREAMSHIFT_UPDATE instructions, one must make sure that the last use by a VSTREAMSHIFT within a single loop iteration of a particular value in a first (general-purpose) register file Rxx and a second (dedicated streamshift) register file Dyy are of the same VSTREAMSHIFT_UPDATE kind, where xx and yy ate two numbers, possibly distinct in embodiments that allow for different register numbers to be used as values input to general-purpose and dedicated streamshift register files. For embodiments without VSTREAMSHIFT_UPDATE instructions, one must implement an instruction that explicitly copies Rxx from the first register file to Dyy in the dedicated streamshift register file. This copy is placed after its last use of Rxx and Dyy registers by a VSTREAMSHIFT instruction, in the current logical iteration. For embodiments that do not implement VSTREAMSHIFT_UPDATE instructions, a move instruction from the primary file to the secondary file must be added after the VSTREAMSHIFT instruction. This would have been converted to a VSTREAMSHIFT_UPDATE instruction in embodiments that do implement VSTREAMSHIFT_UPDATE instructions.

A distinct characteristic of the method 500 is that the method 500 breaks SIMDization down into a sequence of transformations, each of which gradually transforms scalar computations to computations of physical vectors. This process is clearly illustrated by the evolution of data properties through each phase. For example, first the three aggregation steps (i.e., steps 504-508) convert the scalar computations to generic operations to packed, unaligned vectors of arbitrary length. Then, alignment devirtualization (i.e., step 510) transforms unaligned vectors to aligned vectors, bringing virtual vectors one step closer to physical vectors. Length devirtualization (i.e., step 512) then maps aligned virtual vectors to physical vectors. Finally, generic vector operations are lowered to platform-specific SIMD instructions (i.e., step 514).

Figure 6:
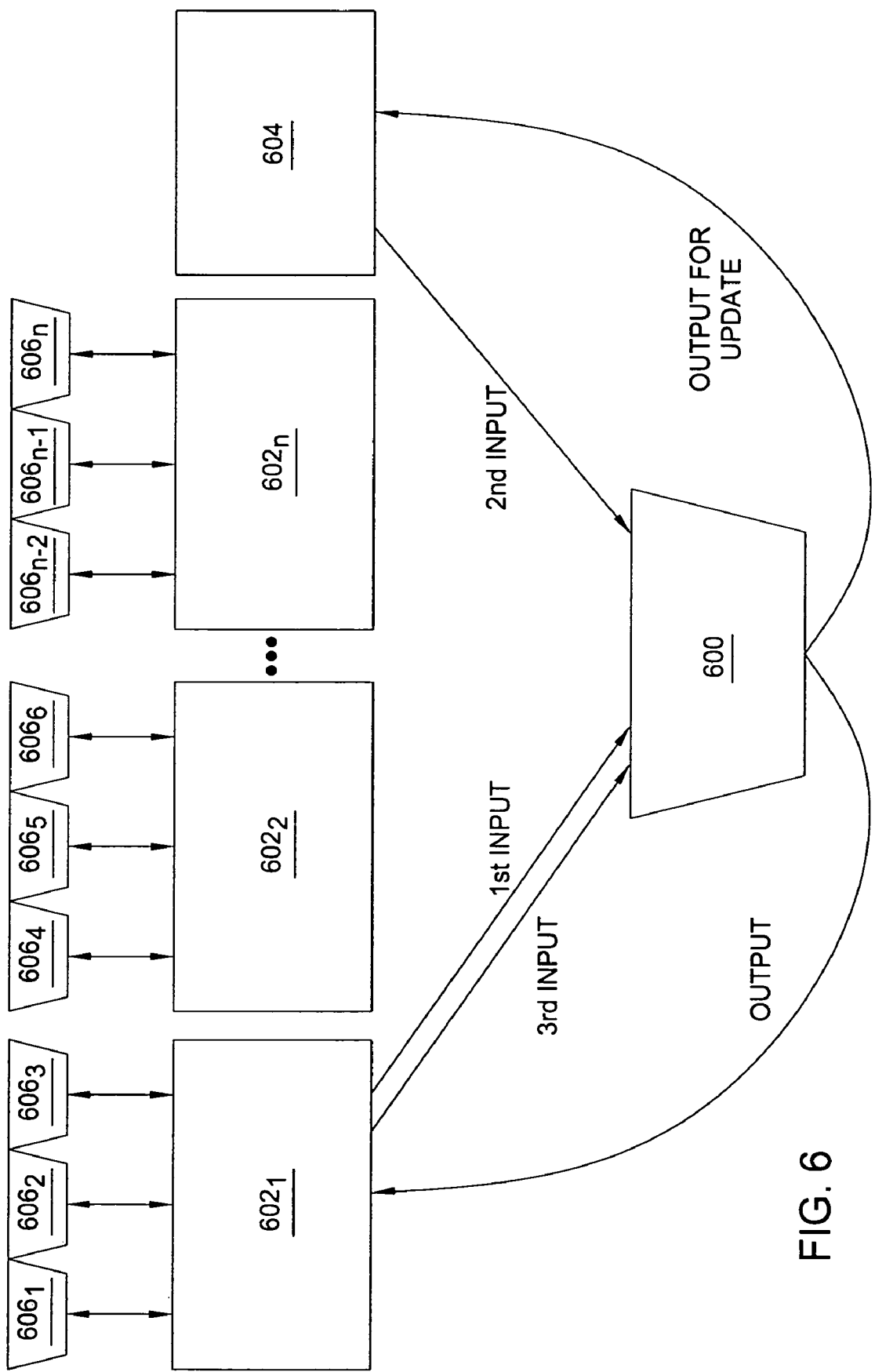
FIG. 6 is a block diagram illustrating one embodiment of a hardware implementation of a streamshift unit.

FIG. 6 is a block diagram illustrating one embodiment of a hardware implementation of a streamshift unit 600. The streamshift unit 600 is capable of performing operations in accordance with the VSTREAMSHIFT and VSTREAMSHIFT_UPDATE operations described above.

As illustrated, the streamshift unit 600 is capable of accessing a plurality of general purpose register files $602_1$-$602_n$ (hereinafter collectively referred to as "general purpose register files 602"), each of the general purpose register files 602 in turn having access to one or more processing units $606_1$-$606_n$. In addition, the streamshift unit 600 is capable of accessing a dedicated streamshift register file 604. As described above, the dedicated streamshift register file 604 is accessible only by the streamshift unit 600 to implement the VSTREAMSHIFT and VSTREAMSHIFT_UPDATE instructions. As described above, a "general purpose" register file is any register file that is not a dedicated streamshift register file. When vector registers are employed, the first input, second input, output and output for update are also vector registers. The third input may be a vector register, or may come from a traditional scalar register file. In addition, the third input may come from a general purpose register file or from a dedicated streamshift register file.

Although FIG. 6 depicts each of the first and third inputs and the streamshift unit output as coming from and going to the same general purpose register file (i.e., register file $602_1$), those skilled in the art will appreciate that this will not always be the case. For example, as discussed earlier, the third input may be retrieved from a register file associated with address generation, while the first input may be retrieved from and the streamshift unit output may be sent to a vector register. A number of other meaningful combinations of register files associated with the first input, the third input and the streamshift unit output are possible, even if not explicitly depicted in FIG. 6.

Figure 7:
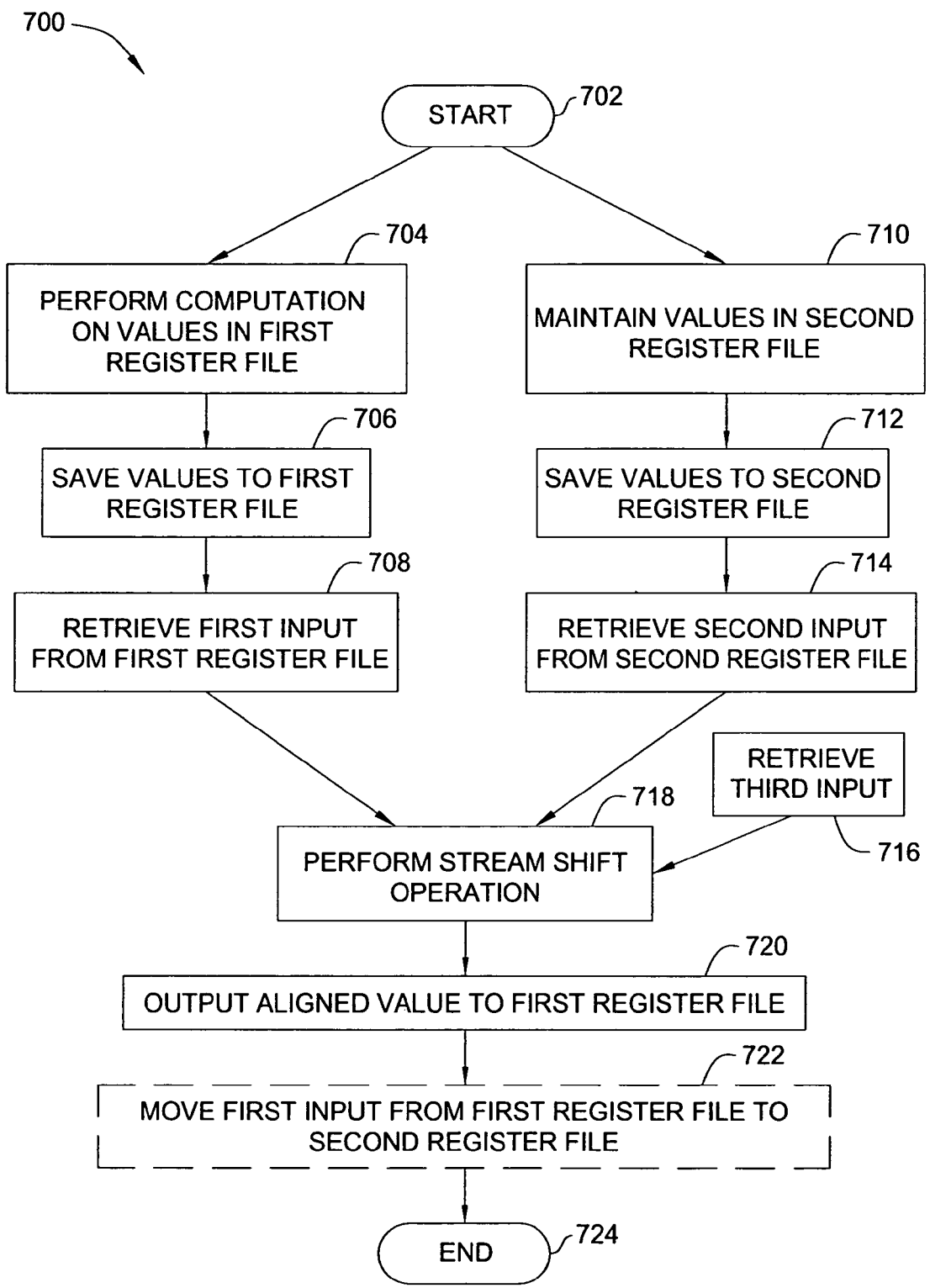
FIG. 7 is a flow diagram illustrating another embodiment of a method for responding to requests for misaligned data, according to the present invention.

FIG. 7 is a flow diagram illustrating another embodiment of a method 700 for responding to requests for misaligned data, according to the present invention. The method 700 is initialized at step 702 and, in one embodiment, proceeds in parallel to steps 704 and 710.

In step 704, the method 700 performs a computation on values in a first (general purpose) register file. These values are saved to the first register file in step 706. In step 708, a first input is retrieved from among these values in the first register file.

In step 710, the method 700 maintains values in a second (dedicated streamshift) register file. In one embodiment, the values maintained in the second register file are copied values (e.g., post-computation) from the first register file. These values are saved to the second register file in step 712. In step 714, a second input is retrieved from among these values in the second register file. As noted above, steps 704-708 may be performed in parallel with steps 710-714, as illustrated. In an alternative embodiment, steps 704-708 and steps 710-714 are performed in sequence.

In step 716, a third input representing a shift pattern (e.g., an offset) is retrieved. The method 700 then proceeds to step 718 and performs a stream shift operation in accordance with the first input, the second input and the third input. In step 720, the resultant aligned value of the stream shift operation is output to the first register file. Depending on the value of the third input, the aligned value may "ignore" data from one of the first input or the second input, and comprise only data from the input that is not ignored. When activated (e.g., using the -UPDATE variant of the VSTREAMSHIFT instruction, embodiments implementing VSTREAMSHIFT_UPDATE instructions, or using explicit move instructions for embodiments that do not implement VSHIFTSTREAM_UPDATE instructions), optional step 722 (illustrated in phantom) copies the first input from the first register file to the second register file.

Figure 8:
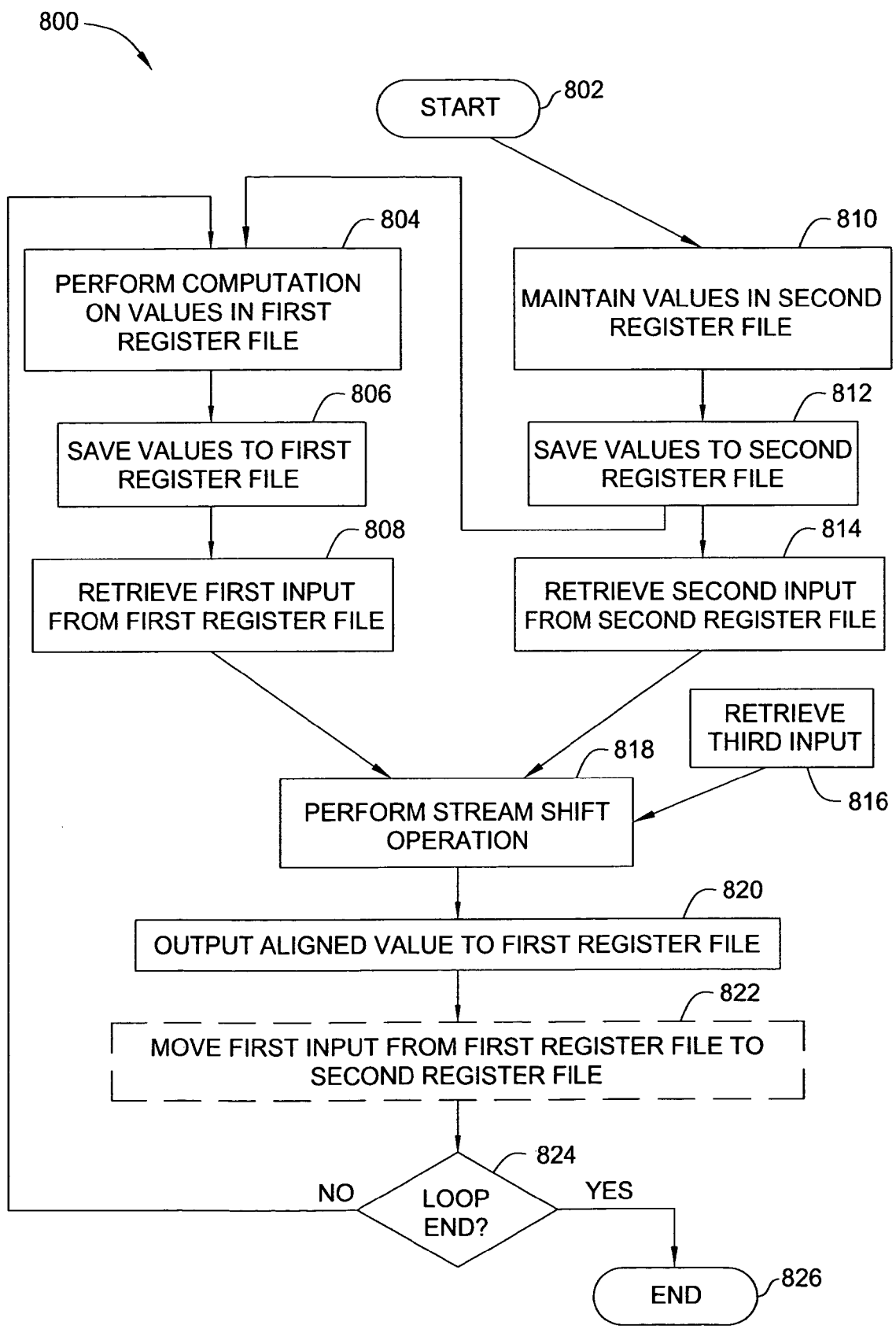
FIG. 8 is a flow diagram illustrating another embodiment of a method for responding to requests for misaligned data, according to the present invention.

FIG. 8 is a flow diagram illustrating another embodiment of a method 800 for responding to requests for misaligned data, according to the present invention. The method 800 is substantially similar to the method 700, but reuses data from the second register file. The method 800 is initialized at step 802 and proceeds to step 810, where the method 800 maintains values in the second (dedicated streamshift) register file. These values are saved to the second register file in step 812. At the same time, these values are also moved to the first register file.

In step 804, the method 800 performs a computation on values in the first (general purpose) register file, including the values migrated from the second register file. These values are saved to the first register file in step 806. In step 808, a first input is retrieved from among these values in the first register file. In step 814, a second input is retrieved from among these values in the second register file, and in step 716, a third input representing a shift pattern (e.g., an offset) is retrieved.

The method 800 then proceeds to step 818 and performs a stream shift operation in accordance with the first input, the second input and the third input. In step 820, the resultant aligned value of the stream shift operation is output to the first register file.

Optionally, the first input from the first register file may be moved from the first register file to the second register file in step 822 (illustrated in phantom). The aligned value will only be moved from the first register file to the second register file if the second input retrieved from the second register file is no longer needed by the method 800.

In step 824, the method 800 determines whether the stream shift execution loop should terminate. If the method 800 concludes that the loop should not terminate, the method 800 returns to step 804 and proceeds as described above to perform a computation on values in the first register file (now including the aligned value output in step 820). Alternatively, if the method 800 concludes in step 824 that the loop should terminate, the method 800 terminates in step 826.

Figure 9:
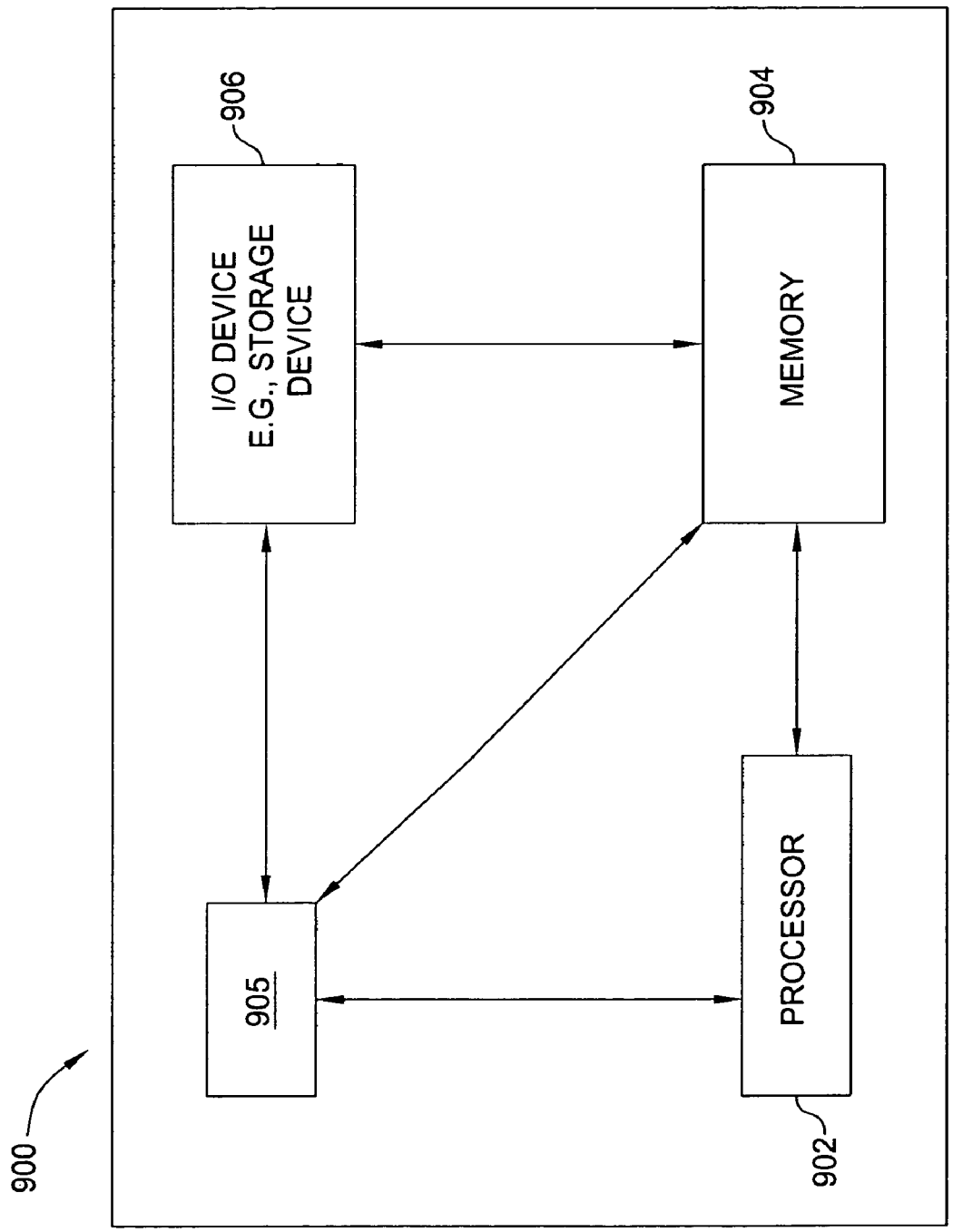
FIG. 9 is a high level block diagram of the data alignment method that is implemented using a general purpose computing device.

FIG. 9 is a high level block diagram of the data alignment method that is implemented using a general purpose computing device 900. In one embodiment, a general purpose computing device 900 comprises a processor 902, a memory 904, a data alignment module 905 and various input/output (I/O) devices 906 such as a display, a keyboard, a mouse, a modem, and the like. In one embodiment, at least one I/O device is a storage device (e.g., a disk drive, an optical disk drive, a floppy disk drive). It should be understood that the data alignment module 905 can be implemented as a physical device or subsystem that is coupled to a processor through a communication channel.

Alternatively, the data alignment module 905 can be represented by one or more software applications (or even a combination of software and hardware, e.g., using Application Specific Integrated Circuits (ASIC)), where the software is loaded from a storage medium (e.g., I/O devices 906) and operated by the processor 902 in the memory 904 of the general purpose computing device 900. Thus, in one embodiment, the data alignment module 905 for aligning stored data (including misaligned data) described herein with reference to the preceding Figures can be stored on a computer readable medium or carrier (e.g., RAM, magnetic or optical drive or diskette, and the like).

Thus, the present invention represents a significant advancement in the field of memory access. Embodiments of the present invention exploit the advantages of both software- and hardware-based approaches to supporting misaligned memory accesses by associating a dedicated streamshift register with a stream shift function. The stream shift function may be considered akin to a "permute" or shuffle" function, from a compiler perspective, and processes data from both the dedicated streamshift register and from a separate general-purpose (i.e., non-dedicated) register. This shifts a majority of the register pressure to the dedicated streamshift register, allowing for data reuse with less pressure exerted on the remaining general-purpose registers.

While the foregoing is directed to the preferred embodiment of the present invention, other and further embodiments of the invention may be devised without departing from the basic scope thereof, and the scope thereof is determined by the claims that follow.

The invention claimed is:

1. A method for processing instructions and data, said method comprising:
retrieving a first input from a first register file;
retrieving a second input from a second register file, the second register file being accessible only by a stream shift instruction that produces a single memory-aligned value from the first input, the second input, and a third input; and
performing the stream shift instruction to select a sequence of bytes comprising the memory-aligned value in accordance with the first input, the second input, and the third input.

2. The method of claim 1, further comprising:
performing a write update of a first result to said first register file, the first result corresponding to the memory-aligned value; and
performing a write update of a second result to said second register file, the second result corresponding to the first input.

3. The method of claim 2, wherein the first result corresponds to a result of a stream shift operation performed in accordance with the stream shift instruction.

4. The method of claim 1, wherein the third input specifies an amount by which to shift the first input and the second input.

5. The method of claim 4, wherein the shift stream operation comprises:
concatenating the first input and the second input, starting with the first input followed by the second input, to produce a concatenated value;
skipping a first number of bytes of the concatenated value, under control of said third input;
keeping a next group of bytes of the concatenated value, where a size of the group corresponds to a single vector word or wide word width of a vector word unit; and
discarding bytes of the concatenated value that occur after a last value of the group.

6. The method of claim 5, wherein the third input specifies the first number by providing a skip count, the number being one less than an offset.

7. The method of claim 1, wherein the stream shift operation comprises:
performing arbitrary byte shuffling as indicated by a mask.

8. The method of claim 1, wherein at least one byte is copied from the first register file to the second register file in response to the stream shift instruction.

9. The method of claim 1, wherein the first input corresponds to memory data loaded into the first register file, the second input corresponds to data copied by a previous stream shift instruction into the second register file, and the memory-aligned value produced by execution of the stream shift instruction corresponds to an unaligned memory sequence of bytes loaded from a memory address, the memory address having been used to generate a memory read request to load the first input from memory and to generate the third input.

10. The method of claim 1, wherein at least one of the first register file and the second register file is a vector register file.

11. A computer readable storage medium containing an executable program for processing instructions and data, where the program performs the steps of:
retrieving a first input from a first register file;
retrieving a second input from a second register file, the second register file being accessible only by a stream shift instruction that produces a single memory-aligned value from the first input, the second input, and a third input; and
performing the stream shift instruction to select a sequence of bytes comprising the memory-aligned value in accordance with the first input, the second input and the third input.

12. System for processing instructions and data, the system comprising:
a general purpose computing device comprising:
a stream shift unit for performing operations on the data in accordance with a stream shift instruction that produces a single memory-aligned value by selecting a sequence of bytes in accordance with a first input, a second input and a third input;
a plurality of general-purpose register files, at least one of the general-purpose register files containing the first input; and
at least one dedicated register file, the at least one dedicated register file being accessible only by the stream shift unit to implement the stream shift instruction, the at least one dedicated register file containing the second input,
where the third input specifies an amount by which to shift the first input and the second input.

13. The system of claim 12, wherein at least one of the plurality of general-purpose register files and the at least one dedicated register file is a vector register file.

14. The system of claim 12, wherein the third input is contained within at least one of: one of the plurality of general-purpose register files and the at least one dedicated register file.

15. The system of claim 12, wherein the stream shift instruction performs a permute operation in accordance with the first input, the second input and the third input.

16. The system of claim 15, wherein the stream shift instruction further moves the first input from the at least one of the general-purpose register files to the at least one dedicated register file.

17. The system of claim 15, wherein an additional instruction implemented by the stream shift unit moves the first input from the at least one of the general-purpose register files to the at least one dedicated register file.

18. The system of claim 15, wherein the permute operation comprises:
concatenating the first input and the second input, starting with the first input followed by the second input, to produce a concatenated value;
skipping a first number of bytes of the concatenated value, under control of said third input;
keeping a next group of bytes of the concatenated value, where a size of the group corresponds to a single vector word or wide word width of a vector word unit; and
discarding bytes of the concatenated value that occur after a last value of the group.

19. The system of claim 15, wherein the permute operation performs arbitrary byte shuffling in accordance with a mask.

20. The system of claim 12, wherein the first input corresponds to memory data loaded into the at least one of the general-purpose register files, the second input corresponds to data copied by a previous stream shift instruction into the at least one dedicated register file, and a result produced by execution of the stream shift instruction corresponds to an unaligned memory sequence of bytes loaded from a memory address, the memory address having been used to generate a memory read request to load the first input from memory and to generate the third input.

* * * * *